April 26, 1949.
F. E. CLARK
2,468,358
POWER DRILL HOLDER
Filed March 9, 1945
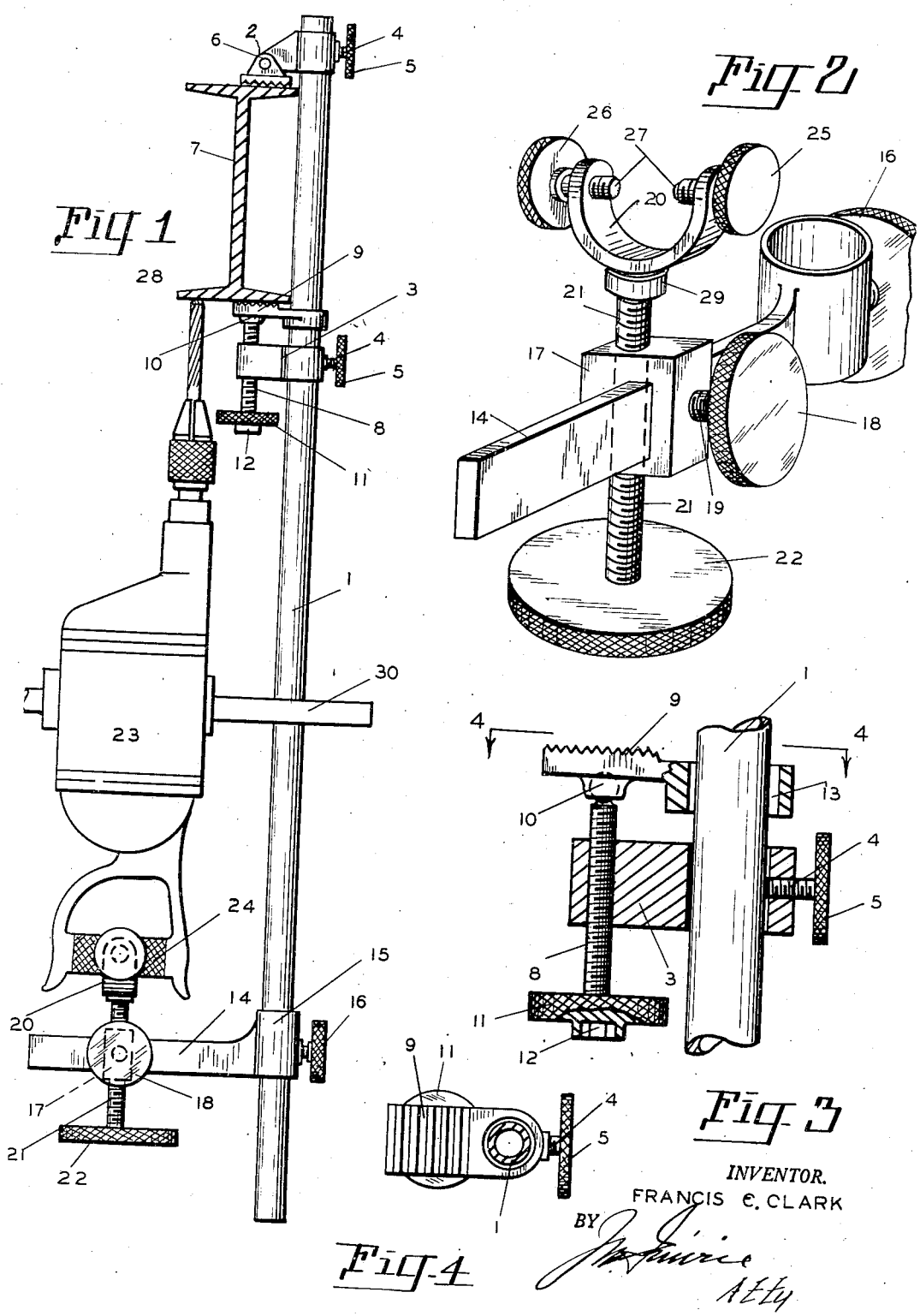
INVENTOR.
FRANCIS E. CLARK Patented Apr. 26, 1949

2,468,358

UNITED STATES PATENT OFFICE 2,468,358

POWER DRILL HOLDER

Francis E. Clark, Kelso, Wash.

Application March 9, 1945, Serial No. 581,851

1 Claim. (Cl. 248—125)

My invention relates to tool holders and is primarily adapted for holding power drills.

The primary object of the invention is to provide a tool holder for holding power drills to beams, girders and the like that are to be drilled by a portable power drill. By the use of my new and improved tool holder, the holder can be clamped to a beam or girder or other structural frames and objects with the power drill mounted thereon in such a manner as to provide a support having the advantages of a drill press.

My new and improved power drill holder is provided with an adjustable clamp for holding the handle of a power drill forcing the drill into the work by a hand wheel and screw. The drill can be positioned relative to the tool holder longitudinally of the drill and the holder and by an adjustment moving the drill away from and towards the holding bar of the tool.

My new and improved power drill holder prevents the body of the drill from rotating and striking the operator, which is an important feature.

My new and improved drill holder can be readily and easily adapted to many and varied applications.

These and other incidental objects will be apparent in the drawings, specifications and claim.

Referring to the drawings:

Figure 1 illustrates my new and improved power drill holder clamped to a beam and having the power drill mounted therein for drilling a hole through the beam.

Figure 2 is a detailed perspective view of the adjustable drill clamp and support, which provides for longitudinal and radial positioning of the power drill relative to the tool holder.

Figure 3 is a detailed fragmentary view of a preferred form of clamp for holding the tool holder to the work.

Figure 4 is a sectional plan view, taken on line 4—4 of Figure 3.

In the drawings:

My new and improved power drill holder consists of a bar 1, which may be of any suitable cross section such as a piece of tubing or pipe. This beam may be of any length depending upon the application to which the holder is to be adapted. Adjustable clamp assemblies 2 and 3 are slidably mounted upon the bar and have set screws 4 forming part of the hand wheels 5 for locking the clamps in any desired position on the bar.

The upper clamp 2 has a pivotally mounted jaw 6 fixed thereto for engaging the object, as for instance the I-beam 7. The lower clamp 3 has an adjustable screw 8 pivotally connected to the jaw 9 at 10. The screw 8 is threadably engaged within the clamp 3 and has a hand wheel 11 for making the initial adjustment.

A socket 12 is provided within the hand wheel 11 for receiving a ratchet socket wrench not here shown, for final adjustment. The jaw 9 is loosely mounted at 13 to the bar 1, permitting the same to pivot while engaging sloping surfaces. Slidably and adjustably mounted to the lower end of the bar is an outwardly extending bracket arm 14, forming part of the hub 15. The hub 15 can be locked at any desired position by the hand wheel and screw 16. A nut or sliding block 17 is mounted to the bracket 14 and is locked to this bracket at any desired position by the hand wheel 18 fixedly secured to the set screw 19, which is threaded within the block 17 and engages the surface of the bracket arm 14.

A U-shaped clamp 20 is provided and rotatably mounted to the vertical feed screw 21. The screw 21 is threaded within the block 17 and is rotated by the hand wheel 22. The power drill 23 is supported by this assembly. The handle 24 of the drill rests within the U-shaped clamp 20 and is locked therein by the hand wheels 25 and 26 forming part of the set screws 27. When the power drill is properly mounted within the clamp 20 it can be forced into the work at 28 by the hand wheel 22, forming part of the feed screw 21.

The usual type of ball and socket arrangement permitting the screw to turn relative to the U-shaped clamp is employed at 29 allowing the drill to remain stationary while the set screw forces the same longitudinally of the holding bar 1 into the work. The holding arms 30 of the drill engages the bar 1, preventing the drill from rotating while the work is being preformed.

From the above description I have provided a tool for holding power drills that is adjustable for clamping the tool to the object to be drilled, means is provided for positioning the drill relative to the holding tool and the work, and locking the same in fixed position and also a means is provided for forcing the drill into the work.

I do not wish to be limited to the exact mechanical form as illustrated, as other mechanical equivalents may be employed still coming within the scope of my claim.

I claim:

A support for fixing a power-driven drill in working cooperation with a work piece, comprising a rod to extend above and below the work piece, an upper clamp slidable on and adjustably fixed relative to the rod, the clamp being mounted for pivotal movement relative to the work piece to accommodate an inclined clamp-engaging face of the work piece, a lower clamp for the work piece, a ring to which the clamp is secured and encircling the rod, said ring having an inner diameter materially exceeding the diameter of the rod to permit a tilting of the lower clamp to engage an inclined surface of the work piece, an adjustable drill clamp ring mounted on the rod, a bar projecting from the ring, a block slidable on the bar, a set screw to fix the block on the bar, a set screw threaded entirely through the block, a yoke above the bar and formed with a ball and socket connection with the upper end of the screw, and set screws passing through the yoke to engage the handle end of the drill.

FRANCIS E. CLARK.

REFERENCES CITED

The following references are of record in the file of this patent:

UNITED STATES PATENTS

| Number | Name | Date |
| --- | --- | --- |
| 879,430 | Adams | Feb. 18, 1908 |
| 895,647 | Lang | Aug. 11, 1908 |
| 980,100 | Hastings | Dec. 27, 1910 |
| 1,267,862 | Haefliger | May 28, 1918 |
| 1,486,933 | Stoltz et al. | Mar. 18, 1924 |
| 2,341,969 | Wiesner | Feb. 15, 1944 |